(12) United States Patent
Chandrasekaran et al.

(10) Patent No.: US 8,615,649 B2
(45) Date of Patent: Dec. 24, 2013

(54) USE OF A PRIVATE KEY TO ENCRYPT AND DECRYPT A MESSAGE

(75) Inventors: Subramaniyam Chandrasekaran, Erode (IN); Arun C. Ramachandran, Coimbatore (IN); Lakshmanan Velusamy, Karur District (IN); Vinodh Kumar Venkatesan, Namakkal District (IN)

(73) Assignee: International Business Machines Corporation, Armonk, NY (US)

(*) Notice: Subject to any disclaimer, the term of this patent is extended or adjusted under 35 U.S.C. 154(b) by 521 days.

(21) Appl. No.: 12/887,012

(22) Filed: Sep. 21, 2010

(65) Prior Publication Data

US 2012/0070003 A1 Mar. 22, 2012

(51) Int. Cl.
*H04L 29/06* (2006.01)

(52) U.S. Cl.
USPC .......................................................... 713/150

(58) Field of Classification Search
USPC .......................................................... 713/150
See application file for complete search history.

(56) References Cited

U.S. PATENT DOCUMENTS

| | | | |
|---|---|---|---|
| 4,405,829 A * | 9/1983 | Rivest et al. ................. | 380/30 |
| 5,727,062 A | 3/1998 | Ritter | |
| 6,499,104 B1 * | 12/2002 | Joux ............................ | 713/176 |
| 7,027,598 B1 | 4/2006 | Stojancic et al. | |
| 7,184,547 B1 * | 2/2007 | Girault et al. ................ | 380/30 |
| 7,512,230 B2 | 3/2009 | She | |
| 2002/0041683 A1 | 4/2002 | Hopkins et al. | |
| 2004/0078407 A1 * | 4/2004 | Naslund et al. .............. | 708/492 |
| 2005/0031120 A1 * | 2/2005 | Samid ........................... | 380/28 |
| 2005/0086196 A1 | 4/2005 | Peterson | |
| 2006/0159259 A1 | 7/2006 | Gentry | |
| 2006/0210066 A1 * | 9/2006 | Villegas et al. .............. | 380/28 |
| 2009/0103726 A1 | 4/2009 | Ahmed | |

OTHER PUBLICATIONS

Chandrasekaran et al.. A novel asymmetric keyless algorithm. Nov. 14, 2009.*
Jablon. Strong password-only authenticated key exchange. Sigcomm. Sep. 25, 1996.*
Winton. Enhancing the Massey-Omura Cryptosystem. 2007.*
Mirvaziri et al., "Message Based Random Variable Length Key Encryption Algorithm", Journal of Computer Science 5 (8) 2009, pp. 573-578.
Sobe et al., "Combining Compression, Encryption and Fault-tolerant Coding for Distributed Storage", 2007, IEEE, pp. 1-8.

* cited by examiner

*Primary Examiner* — Lynn Feild
*Assistant Examiner* — Bryan Lee
(74) *Attorney, Agent, or Firm* — Yee & Associates, P.C.; Tom Tyson

(57) ABSTRACT

The invention includes a method for encrypting and transmitting a message M from a first location to a second location. Random numbers P and Q are initially selected, each of them being either a prime or a non-prime number. P and Q are both furnished to a sender and a recipient at the first and second locations, respectively. A client at the first location generates an encrypted message E, which is the remainder left when a modulus operator divides a first quantity, equal to M multiplied by P to the i power, where i is a selected number, by a second quantity equal to (PQ−1). A tuple comprising E and i is transmitted from the first location to the second location, and a second data processing system at the second location to determines the message M from E, i and Q.

17 Claims, 3 Drawing Sheets

| (P,i) | (PQ-1) | (P i)mod(PQ-1) | |
|---|---|---|---|
| 5,1 | 9 | 5mod9 = 5 | ← 402 |
| 5,2 | 9 | 25mod9 = 7 | ← 404 |
| 5,3 | 9 | 125mod9 = 8 | ← 406 |

| P | Q | M | E | i | |
|---|---|---|---|---|---|
| 5 | 50024 | 2001 | 10005 | 1 | ← 502 |
| 5 | | | | | |
| 5 | 50024 | 2001 | 6 | 3 | ← 504 |
| | | | | | |
| 5 | 50024 | 2001 | 250109 | 4 | ← 506 | great# USE OF A PRIVATE KEY TO ENCRYPT AND DECRYPT A MESSAGE

BACKGROUND OF THE INVENTION

1. Field of the Invention

The invention disclosed and claimed herein pertains generally to a method and system for encrypting, transmitting and decrypting a message, wherein a private or secret key is furnished to both the sender and the receiver of the encrypted message. More particularly, the invention pertains to a method and apparatus of the above type, wherein modular arithmetic is used to achieve faster encryption, and to reduce the length or amount of transferred data.

2. Description of the Related Art

There is a continuing and ever increasing need for encryption algorithms that can be applied to computer related transmissions. These algorithms should be capable of providing encryption which is very hard to break or decode, that is, encryption which is non-deterministic polynomial-time (NP) hard. It is also desirable to minimize the amount of computing power that is required to implement an encryption algorithm.

As is well known by those of skill in the art, modular or modulo arithmetic is an arithmetic system in which integers return to zero, or "wrap around", after a specified value, or modulus, has been reached. In the past, efforts to use modulo arithmetic in encryption algorithms have been significantly hampered, since such algorithms generally could not use non-prime numbers. As is also well known by those of skill in the art, a prime number is a positive integer that cannot be divided by any positive integer, except one and itself, without leaving a remainder. Accordingly, a non-prime number is a positive integer that can be divided by at least one other positive integer, in addition to one and itself, without leaving or producing a remainder.

Previous algorithms of the above type have not used non-prime numbers for at least two reasons. One reason is that encryption could result in zero. Another reason was that an encryption result was not necessarily unique, that is, it would be possible that a result would not be limited to a one to one mapping between an original message and the encrypted message.

SUMMARY OF THE INVENTION

The invention is directed to a method and apparatus for encrypting a message to be transmitted, wherein embodiments of the invention use an operator of the modular arithmetic system, as well as other elements thereof. In one embodiment of the invention, a method is provided for transmitting a message with encryption from a sender at a first location to a recipient at a second location, wherein the message comprises a specified number M. The method comprises the steps of selecting a first random number P and a second random number Q, and furnishing the numbers P and Q to both the sender at the first location and the recipient at the second location. A first data processing system at the first location is operated to generate an encrypted value E that represents message M, wherein E comprises the remainder which results when a modulus operator defined by a system of modular arithmetic is employed to divide a first quantity by a second quantity. The first quantity is equal to the product of M multiplied by P to the i power, wherein i is a selected number, and the second quantity is equal to the result obtained by subtracting one from the product of P multiplied by Q. The method further comprises transmitting a tuple comprising the values of E and i from the first location to the second location, and operating a second data processing system at the second location to determine the message M by selectively processing the values of E, i and Q.

DETAILED DESCRIPTION OF THE EMBODIMENT

Figure 1:
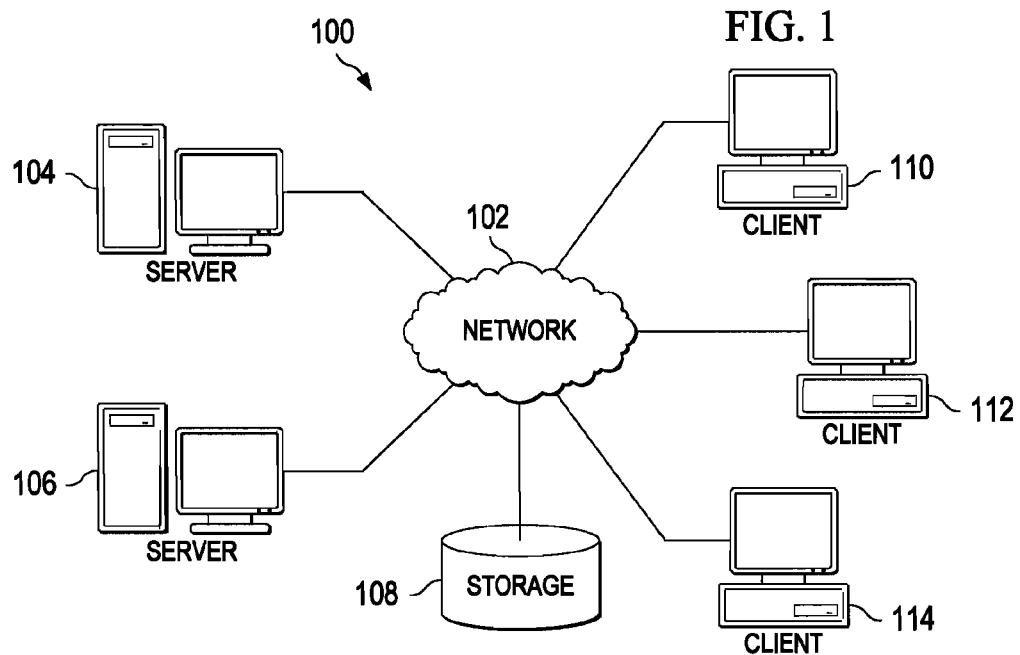
FIG. 1 is a block diagram depicting an environment in which embodiments of the invention may be used.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, there is shown a block diagram of a systems network 100, comprising data processing systems with which embodiments of the present invention may be implemented. Systems network 100 is a network of computers and other components that includes a linking network 102, the medium used to provide communication links between various devices and computers connected together within systems network 100. Network 102 may include connections, such as wire, wireless communication links, or fiber optic cables.

In the depicted example, server 104 and server 106 connect to network 102 along with a storage unit 108. In addition, clients 110, 112, and 114 connect to network 102. These clients 110, 112, and 114 may be, for example, personal computers or network computers. Network data processing system 100 may include additional servers, clients, and other devices not shown. In the depicted example, network 102 of systems network 100 could be the Internet, including a worldwide collection of networks and gateways that use the Transmission Control Protocol/Internet Protocol (TCP/IP) suite of protocols to communicate with one another.

Figure 2:
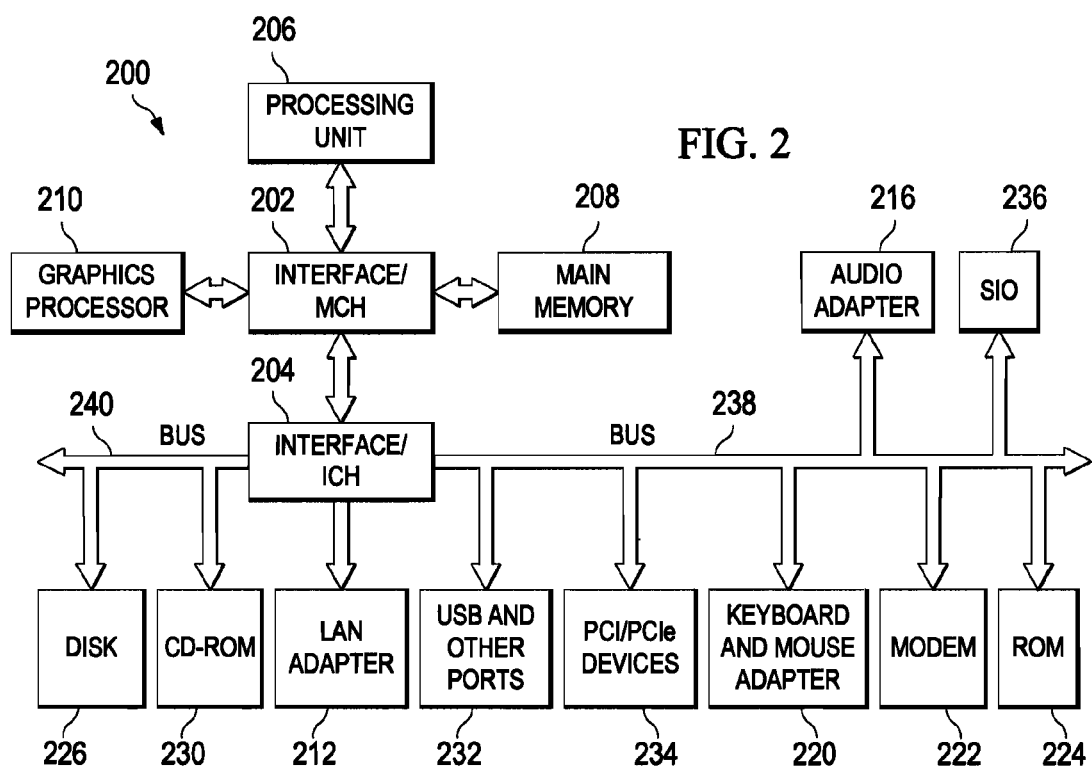
FIG. 2 is a block diagram showing a data processing system which may be used in implementing embodiments of the invention.

Referring to FIG. 2, a block diagram of a data processing system is shown in which aspects of the present invention may be implemented. Data processing system 200 is an example of a computer, such as server 104, or client 110 or client 112 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230. Those of ordinary skill in the art will appreciate that the hardware in FIGS. 1-2 may vary depending on the implementation.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2.

In an embodiment of the invention, clients 110 and 112 could be remotely located from one another, and the user of client 110 could seek to send a message to the user of client 112, where it was necessary to encrypt the message. Accordingly, client 110 could be used to encrypt the message, in accordance with an embodiment of the invention as described hereinafter. The encrypted message would be sent or transmitted to client 112 by means of network 102. Client 112 would then be used to decrypt the message, likewise as described hereinafter.

Figures 3, 4, 5:
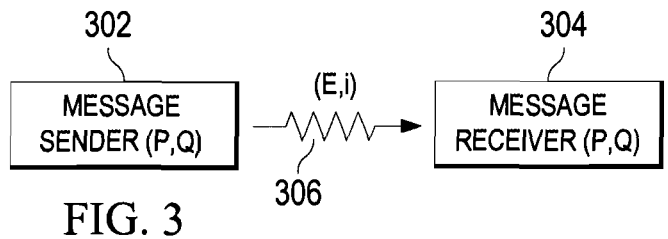
FIG. 3 is a schematic diagram showing simplified components to illustrate an embodiment of the invention.
FIG. 4 shows a table that may be used in an embodiment of the invention.
FIG. 5 is a schematic diagram that illustrates features or characteristics of embodiments of the invention.

Referring to FIG. 3, there is shown a schematic diagram illustrating simplified components for an embodiment of the invention. FIG. 3 more specifically shows a message sender 302 at a first location that is operable to send a message M, following encryption, to a message receiver 304 at a second location. Sender 302 could, for example, comprise a client such as client 110 of FIG. 1, which is used or operated by the sender of the message. Similarly, receiver 304 could comprise a client such as client 112 of FIG. 1, which is used or operated by the recipient of the message. However, embodiments of the invention are not limited thereto. The message M is a number, comprising a positive integer that has a meaning which is known to both the sender at the first location and the recipient at the second location. M could represent a letter of the alphabet or other symbol, or could represent other particular information. M could also be one element in a succession or string of elements that are sent from sender 302 to receiver 304, wherein the elements collectively provide information intended for the recipient at the second location, and each element is an encrypted portion of the information.

In order to encrypt the message M in accordance with an embodiment of the invention, a random number P is selected for the sender 302, and a random number Q is selected for the receiver 304, wherein P and Q are both positive integers. It is to be emphasized that P and Q can each be a non-prime number or a prime number, selectively. P and Q must both be greater than one, that is, P>1 and Q>1, and the product of P and Q minus one, that is, the quantity (PQ−1), must be greater than the message M. A random number i must also be selected for the encryption.

Prior to transmission of the encrypted message, values of both P and Q are provided to the sender at the first location, and are also both provided to the recipient at the second location. Thus, the values of P and Q are secret or private keys, and are both available for use at sender 302 and receiver 304. In the embodiment of the invention, sender 302 encrypts message M by generating an encrypted message value E according to the following relationship:

$$E=(MP^i)\mod(PQ-1) \qquad \text{Equation (1)}$$

Equation (1) could alternatively be stated as E=(MP$^i$)%(PQ−1), wherein the symbols "mod" and "%" both pertain to the modular arithmetic system. Both of these symbols represent the modulus operator, and each symbol specifies that in order to determine E, an operation is to take place that involves both the quantities (MP$^i$) and (PQ−1). More particularly, the operator specifies that (MP$^i$) is to be divided by (PQ−1). The remainder left over following such division step is then determined, and E is equal to the remainder. It is emphasized that an encryption carried out in accordance with Equation (1) will not result in zero, given the respective conditions stated above, including conditions for the values of P, Q and M. Also, such encryption will provide a one to one mapping between the original message M and the encrypted message E.

Referring further to FIG. 3, there is shown the tuple (E, i) being transmitted from sender 302 to receiver 304, as an encrypted message transmission 306. The receiver is thus furnished with the values of E and i. In order to decrypt or decode the encrypted message, receiver 304 determines the value of M by carrying out a process in accordance with the following relationship:

$$M=(EQ^i)\mod(PQ-1) \qquad \text{Equation (2)}$$

As with Equation (1), Equation (2) specifies that M is computed to be the remainder that is left after dividing the quantity (EQ$^i$) by the quantity (PQ−1), which serves as a modulus value.

To illustrate the validity of Equations (1) and (2), a simple example is provided, wherein M=12, P=10, Q=15, and i=2. According to Equation (1), E=12*(10$^2$)mod(10*15−1)=(1200)mod(150−1)=(1200 mod(149)=8, where the symbol (*) is used to represent the operation of multiplication. According to Equation (2), for a value E=8, M=8*(15$^2$) mod(10*15−1)=(1800)mod(149). The result of this operation is M=12, which is correct.

If it is necessary to change the encryption of a given message M, this can be done very readily, simply by varying the value of i. The message can then be sent again, with a new encryption. Also, since the P$^i$ factor of Equation (1) involves powering operations, computation of E can consume a significant amount of time. In order to substantially reduce this time requirement, it is first noted that the following equivalent relationship is valid, in view of certain rules of modular arithmetic:

$$E=(MP^i)\mod(PQ-1)=\{M*[P^i \mod(PQ-1)]\} \mod (PQ-1).$$

In view of this equivalence, a table can be constructed at the sender 302, by computing the quantity [P$^i$ mod(PQ−1)] for different values of P and i. The value of [P$^i$ mod(PQ−1)] for given values of P and i may then be quickly obtained, just by selection from the table. Such values can be precomputed, during periods when the system is idle.

Referring to FIG. 4, there is shown an exemplary table of the above type, for the values P=5 and Q=2. Rows 402-406 show respective values of the quantity [P$^i$ mod(PQ−1)], for i=1, 2 and 3. Thus, at row 402 such quantity is 5, i.e., 9 divided into 5 is 0, with a remainder of 5. At row 404 such quantity is 7, i.e., 9 divided into 25 has a remainder of 7. At row 406 such quantity is 9, i.e., 9 divided into 125 has a remainder of 9. To illustrate the benefit of the table of FIG. 4, it is noted that by using the table, the encryption value for M=3 is computed as $$E=M[P^i \mod(PQ-1)] \mod(PQ-1)]=3*7 \mod 9=21 \mod 9=3.$$

On the other hand, without the table, E would be computed using Equation (1), that is, E=(MP$^i$)mod(PQ−1)=3*(5*5) mod 9=75 mod 9=8. This latter approach clearly involves more computational effort.

A table similar to the table of FIG. 4, for the quantity Q$^i$ mod(PQ−1), can be constructed at the receiver 304 for different values of Q and i. Such a table would be used to reduce computational burden in determining M from the values of E and I at receiver 304.

As described above, the encrypted message is sent as a tuple (E,i). Thus, $S_E$, the transmission length for the total amount of data required to transmit the encrypted message, is equal to the sum of the length of E and the length of i. The length of $S_E$ may in fact be substantially less than the length of message M. Moreover, it has been recognized that $S_E$ can be reduced significantly in embodiments of the invention, by judiciously selecting the particular value of i that is used for the message encryption. By choosing an optimal value of i, a very acceptable tradeoff can be achieved, between the amount of computation involved and the amount of data which is to be transmitted from the sender to the recipient.

Referring to FIG. 5, there is shown a chart which illustrates the very substantial effect that the value of i can have on the length of transferred data $S_E$. More particularly, FIG. 5 shows the values of E which result for specified values of P, Q and M, when i is equal to 1, 3 and 4, respectively. For this illustration, P=5, Q=50024 and M=2001.

Applying these respective values to Equation (1), row 504 of FIG. 5 shows that E is equal to 6, for i=3. Thus, the total length or amount of data for the encrypted message is the sum of the amount of data that is needed to transmit two single digit numbers, i.e., E=6 and i=1. It is readily apparent that the amount of data needed to transmit these two single digit values is much less than the data needed to transmit the message M=2001, which has a length of four digits.

Referring further to FIG. 5, row 502 shows that for i=1, i is a single digit number, but E is equal to 10005, which is a five digit number. Similarly, row 504 shows that for i=4, i again is a single digit number, but E is equal to 250109, a six digit number. Clearly, the data transmission length for E and i when i is equal to 1, and also the transmission length when i is equal to 4, is substantially greater than the transmission length when i is equal to 3.

Figure 6:
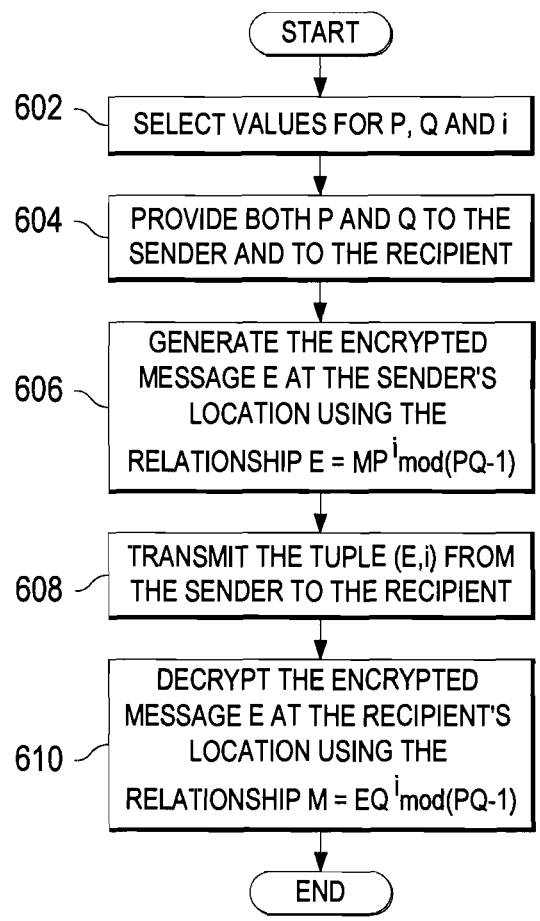
FIG. 6 is a flow chart showing steps for a method comprising an embodiment of the invention.

Referring to FIG. 6, there is shown a flow chart depicting basic steps of a method comprising an embodiment of the invention, as described above. Values for P, Q and i are respectively selected at step 602. At step 604, P and Q are both furnished or provided to the sender of message M at the first location, and are also furnished to the recipient at the second location. At step 606, the encrypted message E is generated at the sender's location, using the relationship $E=MP^i \mod(PQ-1)$. As described above, this step may make use of a precomputed value of $P^i \mod(PQ-1)$ for the selected value of i, if such precomputed value is available in a table or the like.

Referring further to FIG. 6, step 608 indicates transmission of the tuple (E,i) from the sender at the first location to the recipient at the second location. At step 610, the message is decrypted at the recipient's location using the relationship $M=EQ^i \mod(PQ-1)$. The decryption task may make use of a precomputed value for $Q^i \mod(PQ-1)$ for the selected i, if such precomputed value is available in a table or the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for transmitting a message with encryption from a sender at a first location to a recipient at a second location, wherein the message comprises a specified number M, and said method comprises the steps of:
   selecting a first random number P and a second random number Q;
   furnishing the numbers P and Q to both the sender at the first location and the recipient at the second location;
   operating a first data processing system at the first location to generate an encrypted value E that represents the message M, wherein E comprises the remainder which results when a modulus operator defined by a system of modular arithmetic is employed to divide a first quantity by a second quantity, the first quantity is equal to the product of M multiplied by P to the i power ($MP^i$), wherein i is a selected random number, and the second quantity is equal to the result obtained by subtracting one from the product of P multiplied by Q;
   transmitting a tuple comprising the values of E and i from the first location to the second location; and
   operating a second data processing system at the second location to determine the message M by applying the modulus operator to a third quantity and to said second quantity, wherein M comprises the remainder which results when the modulus operator is employed to divide the third quantity by the second quantity, and the third quantity is equal to the product of E multiplied by Q to the i power ($EQ^i$).

2. The method of claim 1, wherein:
   At least one of the numbers P and Q is a non-prime number, and the other of said numbers P or Q is a prime number or a non-prime number, selectively.

3. The method of claim 1, wherein:
   P is greater than 1, Q is greater than 1, and said second quantity, obtained by subtracting one from the product of P multiplied by Q, is greater than the message M.

4. The method of claim 1, wherein:
   the encrypted value E is limited to a value that is non-zero.

5. The method of claim 1, wherein:
   the encrypted value E provides a mapping that is limited to a one to one mapping between the specified number of message M, and the encrypted value E.

6. The method of claim 1, wherein:
   the number i is selectively chosen to provide a total data transmission length for said tuple comprising E and i which is less than the data transmission length required for the message M.

7. The method of claim 1, wherein:
   the encrypted value E representing the message comprises a number in a string of numbers that each comprises an encrypted message element.

8. A computer program product executable in computer readable storage medium for transmitting a message with encryption from a sender at a first location to a recipient at a second location, wherein the message comprises a specified number M, and said computer program product comprises:
   instructions for selecting a first random number P and a second random number Q, wherein at least one of the numbers P and Q is a non-prime number;
   instructions for furnishing the numbers P and Q to both the sender at the first location and the recipient at the second location;
   instructions for operating a first data processing system at the first location to generate an encrypted value E that represents the message M, wherein E comprises the remainder which results when a modulus operator defined by a system of modular arithmetic is employed to divide a first quantity by a second quantity, the first quantity is equal to the product of M multiplied by P to the i power ($MP^i$), wherein i is a selected random number, and the second quantity is equal to the result obtained by subtracting one from the product of P multiplied by Q;
   instructions for transmitting a tuple comprising the values of E and i from the first location to the second location; and
   instructions for operating a second data processing system at the second location to determine the message M by applying the modulus operator to a third quantity and to said second quantity, wherein M comprises the remainder which results when the modulus operator is employed to divide the third quantity by the second quantity, and the third quantity is equal to the product of E multiplied by Q to the i power ($EQ^i$).

9. The computer program product of claim 8, wherein:
   either P or Q can be a prime number or a non-prime number, selectively.

10. The computer program product of claim 8, wherein:
    P is greater than 1, Q is greater than 1, and said second quantity, obtained by subtracting one from the product of P multiplied by Q, is greater than the message M.

11. The computer program product of claim 8, wherein:
    the encrypted value E is limited to a value that is non-zero.

12. The computer program product of claim 8, wherein:
    the encrypted value E provides a mapping that is limited to a one to one mapping between the specified number of message M, and the encrypted value E.

13. The computer program product of claim 8, wherein:
    the number i is selectively chosen to provide a total data transmission length for said tuple comprising E and i which is less than the data transmission length required for the message M.

14. A system for transmitting a message with encryption from a sender at a first location to a recipient at a second location, wherein the message comprises a specified number M, and said system comprises:
    means for selecting a first random number P and a second random number Q, wherein at least one of the numbers P and Q is a non-prime number;

means for furnishing the numbers P and Q to both the sender at the first location and the recipient at the second location;

a first data processing system operable at the first location to generate an encrypted value E that represents the message M, wherein E comprises the remainder which results when a modulus operator defined by a system of modular arithmetic is employed to divide a first quantity by a second quantity, the first quantity is equal to the product of M multiplied by P to the i power ($MP^i$), wherein i is a selected random number, and the second quantity is equal to the result obtained by subtracting one from the product of P multiplied by Q;

means for transmitting a tuple comprising the values of E and i from the first location to the second location; and operating a second data processing system at the second location to determine the message M by applying the modulus operator to a third quantity and to said second quantity, wherein M comprises the remainder which results when the modulus operator is employed to divide the third quantity by the second quantity, and the third quantity is equal to the product of E multiplied by Q to the i power ($EQ^i$).

15. The system of claim 14, wherein:

either P or Q can be a prime number or a non-prime number, selectively, and P is greater than 1, Q is greater than 1, and said second quantity, obtained by subtracting one from the product of P multiplied by Q, is greater than the message M.

16. The system of claim 14, wherein:

the encrypted value E is limited to a value that is non-zero, and provides a mapping that is limited to a one to one mapping between the specified number of message M, and the encrypted value E.

17. The system of claim 14, wherein:

the number i is selectively chosen to provide a total data transmission length for said tuple comprising E and i which is less than the data transmission length required for the message M.

* * * * *